Figure 1:
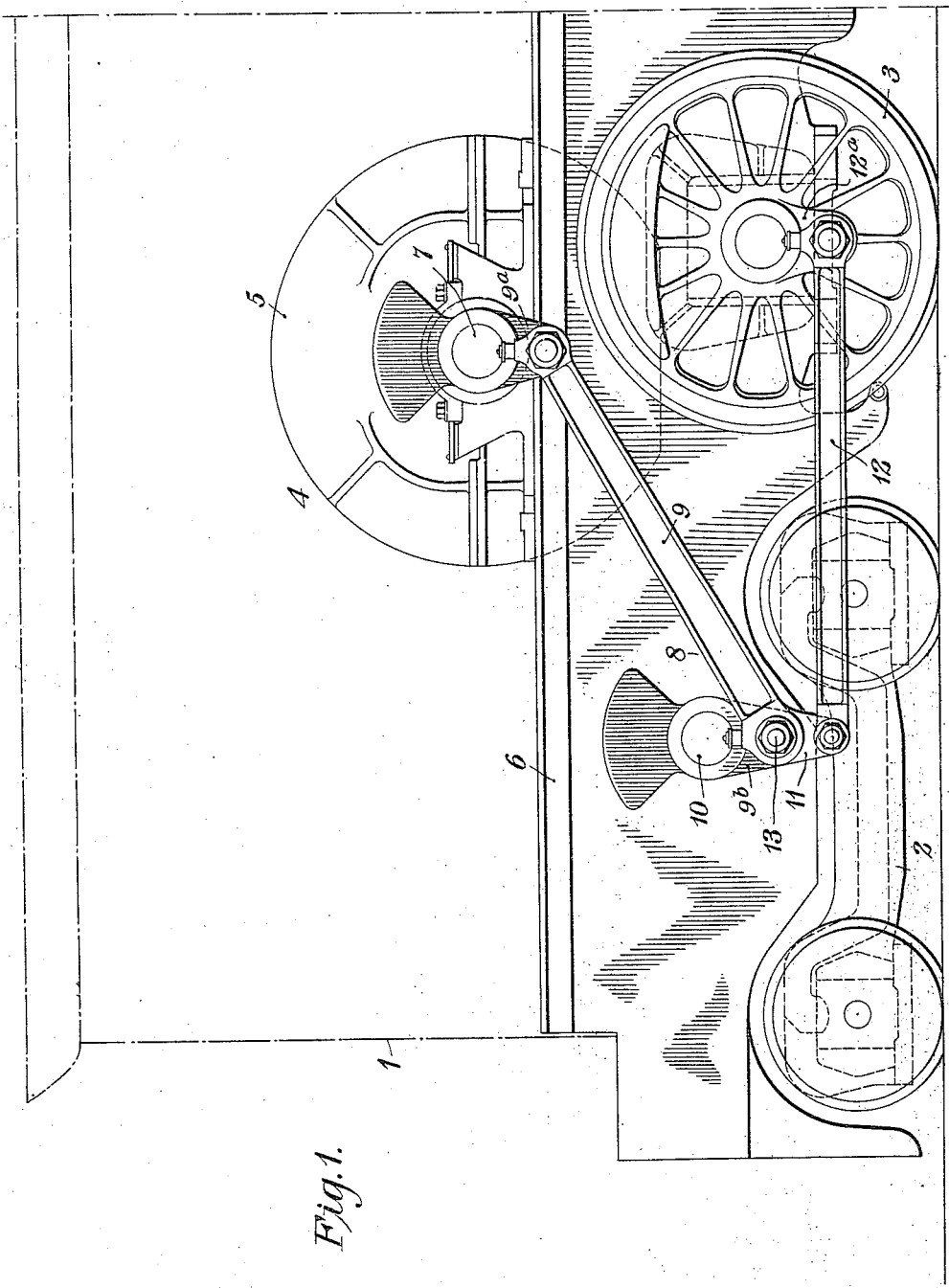

W. COOPER.
ELECTRIC LOCOMOTIVE.
APPLICATION FILED JULY 28, 1909.

985,400.

Patented Feb. 28, 1911.

2 SHEETS—SHEET 1.

WITNESSES:
C. L. Belcher
R. J. Dearborn

INVENTOR
William Cooper
BY
Wesley G. Carr
ATTORNEY

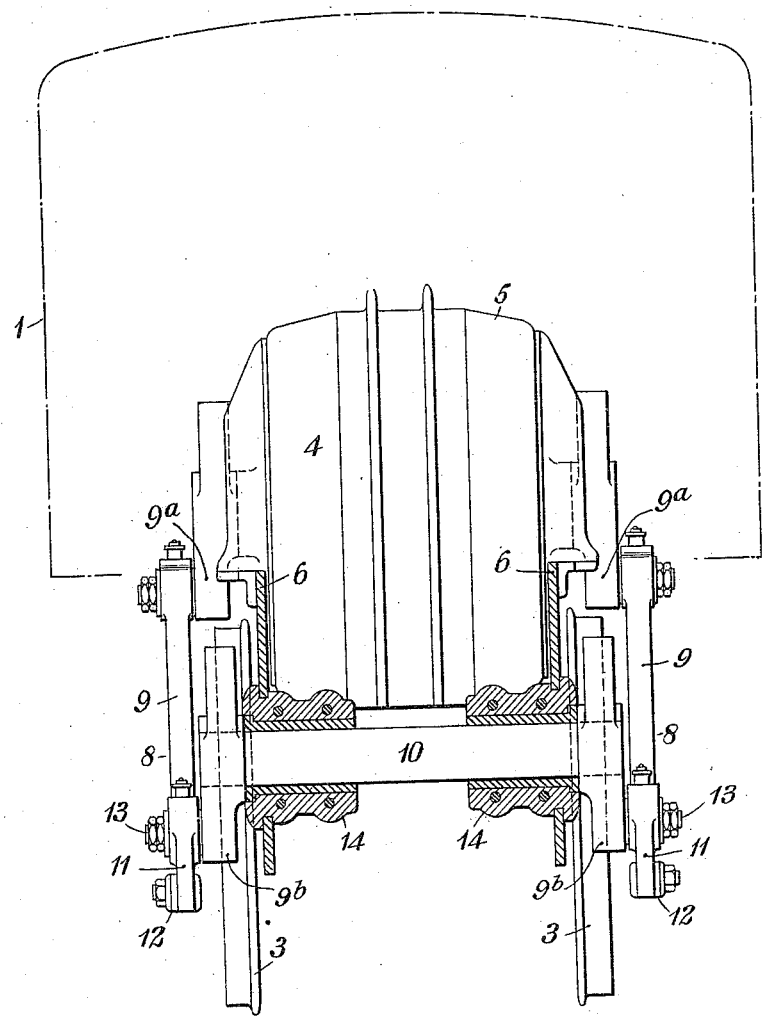

UNITED STATES PATENT OFFICE.

WILLIAM COOPER, OF PITTSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

985,400.

Specification of Letters Patent. Patented Feb. 28, 1911.

Application filed July 28, 1909. Serial No. 509,983.

*To all whom it may concern:*

Be it known that I, WILLIAM COOPER, a citizen of the United States, and a resident of Pittsburg, in the county of Allegheny and State of Pennsylvania, have invented a new and useful Improvement in Electric Locomotives, of which the following is a specification.

My invention relates to driving connections for locomotives and other vehicles, and it has special reference to electric locomotives having propelling motors of relatively large size.

The object of my invention is to provide a driving connection that shall be simple and durable in construction and effective in operation, and that permits of an adjustment between the driving wheels of the vehicle and the propelling motors, so that the motors may be rigidly mounted upon the vehicle body to operate without excessive wear.

When electric locomotives are adapted to haul very heavy loads, the propelling motors are necessarily large in size, and, when the drivers are relatively small, it has been found desirable to mount the motor or motors within the vehicle cab and to establish an operative connection between the motors and the driving wheels by means of connecting or side rods.

According to my present invention, I provide a connection of the above-mentioned general class, but, in order to permit a maximum adjustment between the driving wheels and the vehicle body to which the propelling motor is secured, I employ a jack shaft the center of which is slightly above, and at a material distance to one side of, the center of the driving wheel; a bell crank lever, one arm of which forms the driving connection between the motor and the jack shaft and the other arm of which forms a connection between the jack shaft and a horizontal connecting rod, the opposite end of the horizontal rod being secured to the driving wheel.

Figure 1 of the accompanying drawings is a side elevation and Fig. 2 is an end elevation of a portion of an electric locomotive equipped with my invention.

Referring to the drawings, the locomotive illustrated comprises a cab or body 1, a swivel truck 2, driving wheels 3 and a propelling motor 4. The stationary frame 5 of the motor 4 is rigidly secured to the locomotive frame 6 which forms part of the body 1 and is resiliently mounted on the driving wheels 3, a portion of the weight being borne by the swivel truck 2, in the usual manner.

It will be readily understood by those familiar with the art that the structure illustrated in Fig. 1 may constitute a half unit of an articulated locomotive or may constitute one-half of a locomotive having a rigid wheel base between drivers, both halves corresponding in every respect.

An operative connection is established from the motor shaft 7 to one of the driving wheels 3 by means of a bell crank lever 8, one arm 9 of which is relatively long and is connected, at its lower end to a jack shaft shaft by means of a crank $9^a$ and is similarly connected, at its lower, end to a jack shaft 10 by means of a crank $9^b$. The other arm 11 of the bell crank lever is relatively short and forms an obtuse angle with the arm 9. The outer end of the short arm 11 is connected to one end of a connecting rod 12, the other end of which is connected to a crank $12^a$ with which the axle of the driving wheel 3 is provided.

The arrangement of parts is such that, when the center of the crank pin 13 of the jack shaft 10 is directly below the center of the jack shaft, the point of connection between the short arm 11 of the bell crank lever 8 and the connecting rod 12 is in alinement with the centers of the parts 10 and 13 and is directly below them. The position of the jack shaft is such that the center line of the connecting rod 12 is substantially horizontal, under normal conditions, and, therefore, the usual vertical adjustment between the driving axle and the vertical body may take place with a minimum wear on the operating connections. This is evident from Fig. 1 of the drawings, in which it appears that the connecting rod 12 is long, relative to a vertical movement of the driving axle, and, therefore, its outer end may be materially moved in either direction from the horizontal without causing any bending action between the rod and the crank pin.

The arrangement shown is specially advantageous when the driving wheels are relatively small, since the point of connection between the arm 11 of the bell crank lever 8 and the connecting rod 12 is considerably below the center of the jack shaft which consequently may be conveniently disposed in suitable bearings 14 supported by the vehicle frame.

As shown in Fig. 2, the propelling motor is similarly connected to the driving wheel 3 at the opposite side of the locomotive, one of the connections being preferably advanced through an angle of substantially 90 degrees, in the usual manner.

I claim as my invention:

1. The combination with a driven axle, a propelling motor and a jack shaft, of an operative connection between the motor shaft and the driven axle comprising cranks mounted upon the respective shafts, a bell crank lever connecting the motor shaft crank to the jack shaft crank, and a connecting rod connecting the driven axle crank to the short arm of the bell crank lever.

2. In an electric vehicle, the combination with a driven axle, a body frame mounted on said axle, a driving motor having a stationary frame rigidly secured to the body frame of the vehicle, and a jack shaft substantially parallel to the axis of the motor and to the axle, of an operative connection between the jack shaft and the motor comprising one arm of a bell crank lever, and an operative connection between the other arm of the bell crank lever and the axle.

3. In an electric vehicle, the combination with a driven axle, a body frame mounted thereon, a propelling motor rigidly secured to the body frame above the axle and a short distance to one side of it, and a jack shaft rotatably mounted on the body frame of the vehicle at a short distance above the axle and at a considerable distance to one side of it, of an operative connection between the propelling motor and the axle comprising suitable cranks, a bell crank lever one arm of which constitutes a side rod connection between the motor and the jack shaft, and a side rod connected at one end to the axle crank and at the other end to a short arm of the bell crank lever.

In testimony whereof, I have hereunto subscribed my name this 14th day of July, 1909.

WILLIAM COOPER.

Witnesses:
R. J. DEARBORN,
B. B. HINES.

---

Copies of this patent may be obtained for five cents each, by addressing the "Commissioner of Patents, Washington, D. C."